US 8,032,436 B2

(12) United States Patent
Dailey et al.

(10) Patent No.: US 8,032,436 B2
(45) Date of Patent: Oct. 4, 2011

(54) SYSTEMS AND METHODS FOR FACILITATING AGGREGATION OF SOCIAL CREDITS

(76) Inventors: James Dailey, Seattle, WA (US); April Allderdice, Seattle, WA (US)

(*) Notice: Subject to any disclaimer, the term of this patent is extended or adjusted under 35 U.S.C. 154(b) by 176 days.

(21) Appl. No.: 12/435,977

(22) Filed: May 5, 2009

(65) Prior Publication Data

US 2009/0287543 A1   Nov. 19, 2009

Related U.S. Application Data

(60) Provisional application No. 61/050,584, filed on May 5, 2008.

(51) Int. Cl.
*G06Q 40/00* (2006.01)
(52) U.S. Cl. ......... 705/35; 705/36 R; 705/36 T; 705/37; 705/38; 705/39
(58) Field of Classification Search ............... 705/35–39
See application file for complete search history.

(56) References Cited

U.S. PATENT DOCUMENTS

| 7,529,705 | B1* | 5/2009 | Bartels et al. ............... 705/37 |
| 2002/0143693 | A1 | 10/2002 | Soestbergen et al. |
| 2002/0173979 | A1 | 11/2002 | Daggett et al. |
| 2003/0212790 | A1* | 11/2003 | Thambidurai et al. ........ 709/225 |
| 2004/0225594 | A1* | 11/2004 | Nolan et al. .................... 705/38 |
| 2007/0022027 | A1* | 1/2007 | Gupta et al. .................... 705/35 |
| 2007/0192242 | A1* | 8/2007 | Kunz ............................... 705/38 |
| 2007/0299769 | A1 | 12/2007 | Fowler et al. |
| 2008/0015975 | A1* | 1/2008 | Ivchenko et al. .............. 705/37 |
| 2008/0046277 | A1 | 2/2008 | Stamets |
| 2008/0091589 | A1* | 4/2008 | Kremen ......................... 705/38 |
| 2008/0091626 | A1 | 4/2008 | Kremen |
| 2008/0275815 | A1* | 11/2008 | Musier et al. .................. 705/39 |
| 2008/0300936 | A1* | 12/2008 | Musier et al. .................... 705/7 |
| 2009/0313033 | A1* | 12/2009 | Hafner et al. .................... 705/1 |
| 2010/0332275 | A1* | 12/2010 | Walsh et al. ..................... 705/7 |
| 2011/0145128 | A1* | 6/2011 | Hukkawala et al. ........... 705/37 |

OTHER PUBLICATIONS

International Search Report and Written Opinion for Application No. PCT/IB2009/005816 filed Oct. 20, 2009.

* cited by examiner

*Primary Examiner* — Narayanswamy Subramanian
(74) *Attorney, Agent, or Firm* — Nixon Peabody LLP

(57) ABSTRACT

Various embodiments are directed to systems and methods for facilitating the aggregation of carbon reduction credits resulting from finance loans financing the purchase of energy technology. For example, a credit aggregator may receive from a finance institution estimate parameters describing a loan type. The credit aggregator may calculate a value of a carbon reduction credit associated with each loan of the loan type considering the estimate parameters and display the value to the finance institution. In addition, the credit aggregator may receive bid data and booking data from the finance institution. When a credit is booked, the credit aggregator may receive from the finance institution periodic indications of a status of the intervention technology.

5 Claims, 13 Drawing Sheets

SIGN UP AND CREATE AN ACCOUNT

400

Community Resources

Forums
Knowledge Base
Please create an account
and sign in to find useful
articles about clean energy
in developing projects and
suppliers of equipment. Our
forums are only open to
members.

First name *

Last name *

Email address (also serves as your * login):

Password *

Confirm Password *

Name of MFI *

Number of active borrowers *

Size of gross portfolio (USD) last * year

Mix Market Profile? * ◯ Yes ◯ No

Website of mfi *

Country of operation * Afghanistan

Notes *

Signup  clear

Figure 4

CREDIT TRACKER

My Balance

| Transaction Date | Transaction Number | Transaction Amount | Payment Mechanism | Running Total Sent |
|---|---|---|---|---|
| 2008-04-12 | 3 | $ 500.0 | paypal | $ 500.0 | micro energy credits

Welcome james | Logout | My Profile | help

MYHOME | ESTIMATOR | MY CREDITS | MY BALANCE | COMMUNITY

Renewable Energy + Your Clients + Carbon Markets

CREDIT TRACKER

Estimate or fix a new Bid | Show existing bids

| Bid ID | Technology | Status | Units Booked | Remaining | Total |
|---|---|---|---|---|---|
| 2 | Biogas digester 10 cows | Pending 2008-02-05 | 100 | 0 | 100 |

Reasons to join

Renewable energy growth in developing countries [article]

What are carbon credits and why do they matter? [article]

Community Resources

Forums
Knowledge Base
Please create an account and sign in to find useful articles about clean energy in developing projects and suppliers of equipment. Our forums are only open to members.

CREDIT TRACKER

<< back to credit listing

Credit:
Bid ID: 6

Customer Name:
John Doe

Physical Address:
123 Market Lane

Component Description:
X Vendor system at perfect power

Install Date:
Tue Apr 22 00:00:00 -0400 2008

Latitude: 45.4
Longitude: 34.5

Loan Officer Name:
Xu

Pictures
Bul0711_thumb

History
(No entries for History)
new entry for history

| Admin | Copyright Notice | Privacy Policy | Terms of Use

Figure 13

SYSTEMS AND METHODS FOR FACILITATING AGGREGATION OF SOCIAL CREDITS

PRIORITY CLAIM

This application claims the benefit of U.S. Provisional Application Ser. No. 61/050,584 filed on May 5, 2008, which is incorporated herein by reference in its entirety.

BACKGROUND

Many people worldwide suffer from energy poverty, or a lack of access to affordable, healthy, and environmentally friendly sources of heat and light. Many poor households around the world currently pay relatively higher prices, in both money and time, for energy that is inferior at best and often dangerous. For example, many people in poor areas rely on inefficient three-stone wood or dung burning stoves for light, heat or both. Such energy technologies are linked to infant mortality, weak lighting and deforestation. Further, biomass stoves require people to spend considerable time gathering dung or firewood for energy. Often this task falls to young girls who would otherwise be in school. Smoke and pollution from burning such fires indoors can also lead to respiratory illness, especially in infants and small children. In addition to biomass, many people in poor areas rely on kerosene lamps to provide light. The cost of kerosene in many parts of the world can be quite high. Also, many of the basic lamp designs used today to provide poor light and often cause fire and/or significant injury when touched or knocked over by children or careless adults. In addition, biomass and kerosene energy sources emit carbon dioxide into the atmosphere, which is a known greenhouse gas.

Cleaner, safer and more efficient energy technology is known. For example, improved cook-stoves can provide greater safety and increase cooking efficiency relative to the traditional three-stone fire, thereby reducing greenhouse gas emissions. Simple biogas digesters can be used to convert manure and other organic materials into clean-burning methane gas, which may be used in place of wood, dung and kerosene for light, heat and cooking. Simple solar panels can be used to provide electricity for light as well as for radios, cell phones, and other communications technology that provide critical links to the outside world. It is anticipated that other technological advances will, in the future, provide further advantages to populations in the developing parts of the globe.

Even though simple technology exists to improve the energy situation of developing populations, the cost of the technology often makes it extremely difficult to implement where it is needed most. For example, it is difficult for a poor family to raise the necessary funds to purchase a solar system or even an improved efficiency stove. Also, even if families have the means to purchase additional technology, a lack of financing may stand in the way. For example, in many parts of the world the cost of a solar lighting system is equivalent to a typical poor family's expenditure on kerosene over a relatively short (e.g., two year) period. Also, for example, many local entrepreneurs would be able to leverage increased night-time productivity to pay for the cost of a solar light system if only financing were available. Microfinance institutions (MFI's), such as Grameen Bank in Bangladesh and many others have attempted to fill this financing gap, however, high overhead costs and historic difficulties in obtaining capital have limited the growth of MFI's.

Some have recognized that, in addition to providing health and safety benefits to the world's poor, the implementation of improved energy technologies in the developing world would provide worldwide benefits due to the associated reduction in greenhouse gas emissions. Markets exist for monetizing carbon emission reductions. For example, the United National Framework Convention on Climate Change (UNFCC), often referred to as the Kyoto Protocol, resulted in the subsequent development of a worldwide market for carbon emission reductions. Further, the Kyoto Protocol's Clean Development Mechanism (CDM) allows developed nations to purchase carbon reduction credits from poor countries to meet carbon emission reduction targets. Further, many carbon purchasers are willing to pay a premium for "social carbon" offsets that are linked to social benefits such as energy access for the poor. Due to high transaction costs, though, it is difficult to bring small-scale carbon reductions to market. For example, a carbon finance firm typically will not consider processing a project that offers less than 10,000 tons of carbon, while a single solar home system for a poor household may only offset 5 tons in its lifetime. Accordingly, small-scale projects must be massively aggregates in order to be viable on the carbon markets. Large MFI's, such as the World Bank's carbon-financed Infrastructure Development Company and Grameen Shakti, have successfully aggregated carbon reduction credits from individual household projects, however, not all MFI's have the resources and the customer base to economically do so. This failure has prevented more widespread adoption of MFI techniques to improve the energy and lives of poor households.

SUMMARY

Various embodiments are directed to computer-implemented systems and methods for facilitating microfinance lending for the purchase of socially desirable intervention technology or other items by providing microfinance institutions (MFI's) and their borrowers with access to markets for carbon reduction credits and/or other types of social credits.

FIGURES

Various embodiments of the present invention are described here by way of example in conjunction with the following figures, wherein:

FIG. 4 illustrates a screen shot of one embodiment of a screen provided to an MFI user according to the MFI user interface shown in FIG. 2 to register the user with the system.

FIG. 12 illustrates a screen shot of one embodiment of a screen provided to an MFI user according to the MFI user interface showing additional details of a set of previously booked credits from an installation.

FIG. 13 illustrates a screen shot of one embodiment of a screen provided to an MFI user according to the MFI user interface to verify existing installations.

DESCRIPTION

According to various embodiments, a credit aggregator facilitates access to the social credit markets for MFI's. For example, the credit aggregator may provide automated systems and methods for estimating the value of credits, booking the credits, providing payment for the credits and verifying the credits' validity. In this way, MFI's may be given efficient access to social credit markets. This may increase the MFI revenue and, thereby, decrease both capital requirements and the ultimate cost of the technology to the borrowers. The credit aggregator may verify and aggregate the credits into lots of a size that may be sold into the relevant markets either directly or via an intermediate entity such as a carbon or other credit trading firm. Because the credit aggregator works directly with MFI's 104 in a documented and verified manner, credits generated and ultimately sold may have a direct chain of title from the borrowers 108 to the end market.

The credit aggregator may aggregate any kind of credit that can be generated by the lending activities of MFI's and subsequently sold to individuals or in a credit market. For example, carbon reduction credits are generated when MFI's finance the purchase of intervention technology that reduces greenhouse gas emissions relative to existing baseline technology. Carbon reduction credits, however, are just one example of the marketable social credits that may be generated by MFI activity and commercialized by the credit aggregator. Many intervention technologies financed by MFI's increase household income (e.g., by reducing time spent searching for fuel, by providing additional productivity at night, etc.). This may result in Millennium Development Goal (MDG) credits. A Millennium Development Goal (MDG) credit represents 1% of 1 household reaching the Millennium Development Goals in their country. For example, if a solar energy system enables a household living on less than $1/per person per day to earn more than $1/per person per day, that system would receive 100 MDG 1 credits. The MDG credits may then be sold to donors, governments, philanthropists and individuals as a market mechanism to achieve the Millennium Development Goals. Similar credits may be generated and sold for achieving goals around Energy Security (e.g., non-reliance on imported petroleum) and Biodiversity. Credits may also be generated for the certification and tracking of organic and fair trade agriculture and craft production.

Figure 1:
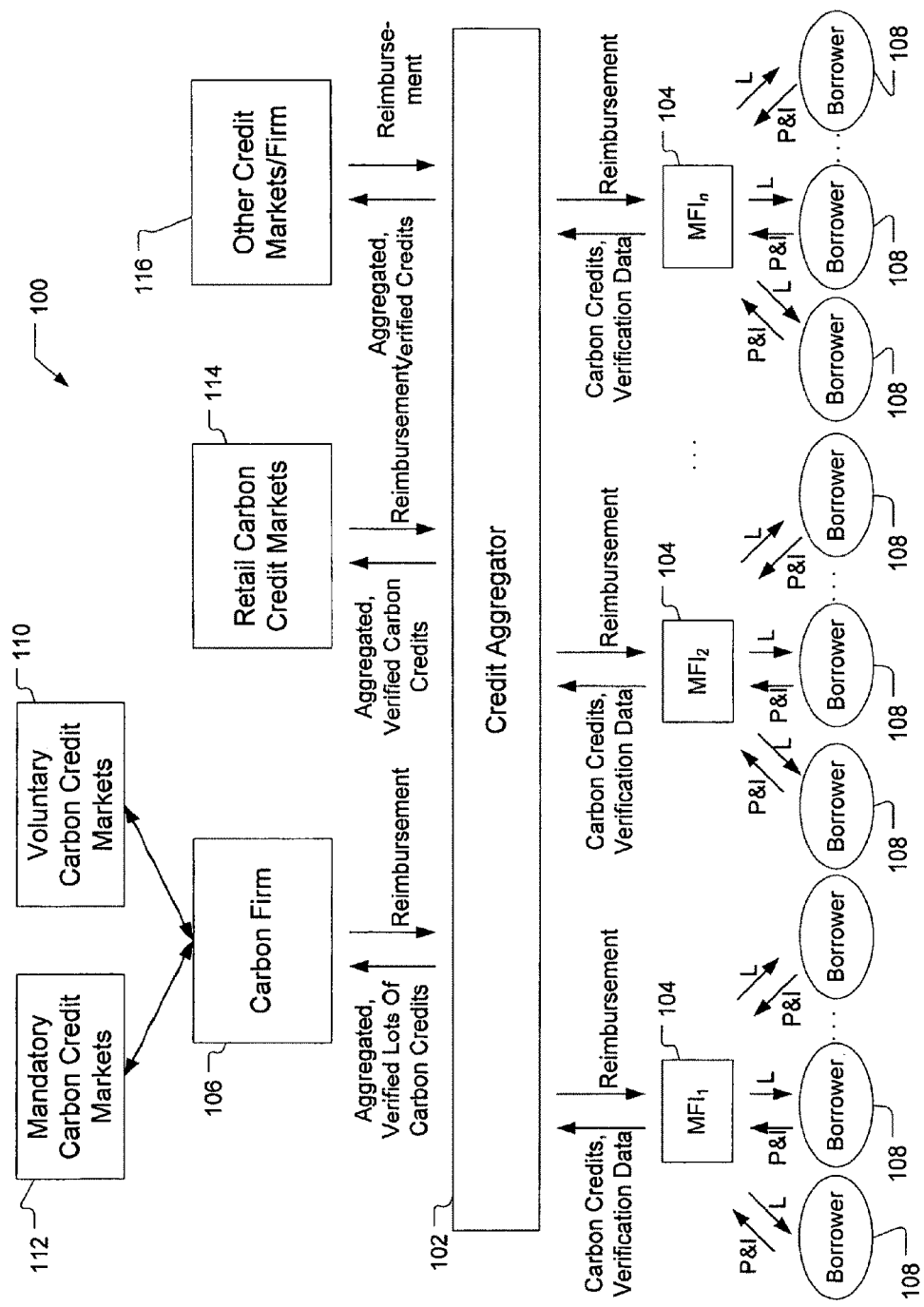
FIG. 1 illustrates one embodiment of a transaction facilitating microfinance lending.

FIG. 1 illustrates one embodiment of a transaction 100 facilitating microfinance lending. A plurality of MFI's 104 may offer micro-finance loans to various borrowers 108. The loans may finance the purchase of intervention technology or other socially valuable products by the borrowers 108. Intervention technology may refer to technology that replaces a baseline technology and provides improved energy to the borrower 108. For example, improved cook-stove technology may replace the baseline technology of a three-stone fire. A solar lighting system may replace baseline technology of a kerosene lamp, candles, or an indoor fire. The borrower 108 may be an individual household (e.g., an improved cook-stove, a solar lighting system, etc.), a local entrepreneur (e.g., a biogas digester operator) and/or a collection of individual households. After receiving loan principal for the purchase of intervention technology, the borrower 108 may provide the MFI's 104 with principal and interest payments on the loan. According to various embodiments, instead of providing loan principal directly to the borrowers 108, the MFI's 104 may instead purchase the intervention technology and, if installation is necessary, install the technology at a dwelling or place of business of the borrower 108.

The credit aggregator 102 may provide functionality described below to the MFI's 104 allowing them to estimate the value of credits originating from a given loan, submit bids to sell credits to the aggregator, verify the installation of the intervention technology to the aggregator 102 and receive payment for the resulting credits. In turn, the aggregator 102 may verify the credits, and bundle them into lots that may be sold to various parties and/or markets. For example, the credit aggregator 102 may sell aggregated, verified lots of carbon reduction credit to a carbon firm 106, which may subsequently sell the credits either on mandatory carbon reduction credit markets 112 or voluntary carbon reduction credit markets 110. The aggregator 102 may, in various embodiments, also provide an outlet for selling some or all of the carbon or other social credits received from the MFI's 104 to retail users, via a retail market 114. Non-carbon reduction credits, such as MDG credits, energy security credits and biodiversity credits may be sold at another credit market or markets 116. It will be appreciated that non-carbon reduction credits may, in some embodiments, be brought to market through a middleman party similar to the carbon firm 106. Also, although the embodiments herein are described for use with microfinance institutions (MFI's 104), it will be appreciated that the systems and methods described may be utilized by any entity willing to finance intervention technology including, for example, local banks, energy cooperatives, intervention technology manufacturers/suppliers, etc. Generally, these parties may be referred to as finance institutions.

Figure 2:
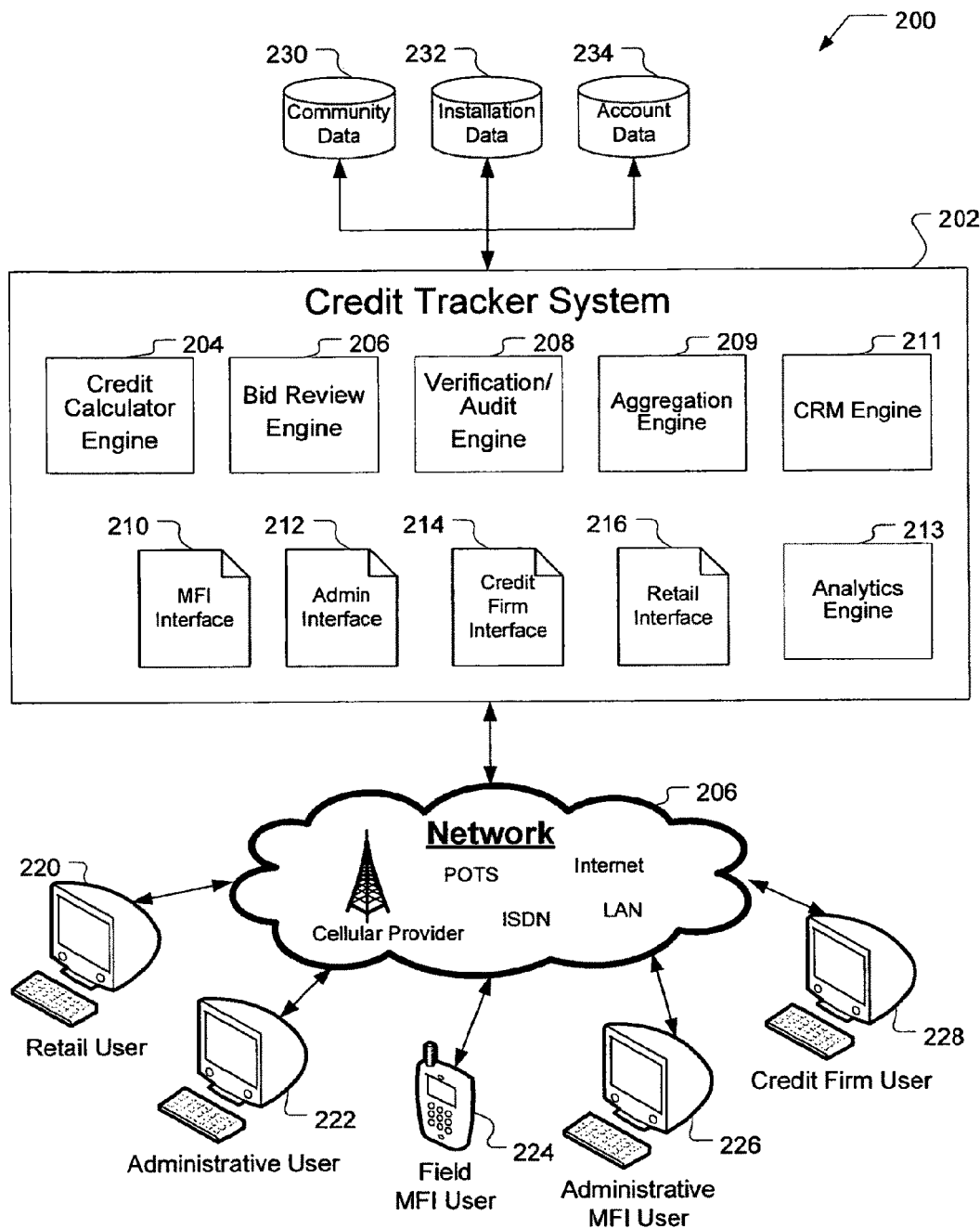
FIG. 2 illustrates one embodiment of an architecture including a computer-implemented credit tracker system for facilitating microfinance lending.

FIG. 2 illustrates one embodiment of an architecture 200 including a computer-implemented credit tracker system 202 for facilitating microfinance lending. The credit tracker system 202 may be operated by the credit aggregator 102 of FIG. 1. The credit tracker system 202 may be implemented by one or more computer devices. Each of the computer devices may comprise at least one processor circuit and operatively associated memory circuit(s). The memory may comprise instructions that, when executed by the at least one processor, cause the computer device or devices to implement the functionality of the system 202, for example, as described herein below. The memory circuits may comprise read only memory (ROM) random access memory (RAM) a hard drive or other non-volatile storage, etc.

The credit tracker system 202 may comprise various engines 204, 206, 208, 209, 211, 213 and interfaces 210, 212, 214, 216. The engines 204, 206, 208, 209, 211, 213 may be implemented as software stored at the memory devices and executed by the at least one processor. When executed, the engines 204, 206, 208, 209, 211, 213 may perform calculations and provide functionality for aggregating credits. The interfaces 210, 212, 214, 216 may each be tailored to a different user type, and may provide various users with access to the functionality of the engines 204, 206, 208, 209, 211, 213. For example, the administrator interface 212 may provide administrative users 222 with a high degree of access to the engines 204, 206, 208, 209, 211, 213, while the MFI interface 210 may be tailored to MFI users 224, 226 and may provide less access to the functionality of the engines 204, 206, 208. The interfaces may be provided to various users via an electronic data network 206. The network 206 may include any suitable type of communication hardware and/or software. For example, the network may comprise, in whole or in part, a Wide Area Network (WAN) such as the Internet, a Local Area Network (LAN), a telephone network (Plain Old Telephone Service "POTS"), an Integrated Services Digital Network (ISDN) and/or a cellular network of a cellular provider.

The users 220, 222, 224, 226, 228 may communicate on the network 206 using various different kinds of communication devices including, for example, mobile phones, desktop computers, laptop computers, personal digital assistants (PDA's), palmtop computers, etc. The network devices may comprise suitable browser software and, for example, the various interfaces 210, 212, 214, 216 may be served to the communication devices by the credit tracker system 202 and viewed via the browsers. Each of the users 220, 222, 224, 226, 228 may be associated with one or more parties of the transaction 100. Administrative users 222 may be associated with the credit aggregator 102. The administrative users 222 may perform several tasks in the credit tracker system 202. For example, administrative users 222 may administer the process of approving credit bids and/or the process of effecting payment to the MFI's 104. Administrative users 222 may administer the various engines 204, 206, 208, 209, 211, 213 including, for example, providing algorithm parameters and data for calculations. Administrative users 222 may access the credit tracker system 202 via an administrative interface 212, providing access to the functionality of the various engines 204, 206, 208. It will be appreciated that administrative users 222 performing different tasks (e.g., administering the engines 204, 206, 208, 209, 211, 213 versus reviewing credit bids) may be provided with different levels of access through the administrative interface 212.

MFI users 224 and 226 may represent the MFI's 104. MFI users 224, 226 may access the credit tracker system via an MFI interface 210. Each MFI 104 may have at least one MFI user, though MFI's 104 may often have multiple users. For example, MFI users may be divided into administrative MFI users 226 and field MFI users 224. Administrative MFI users 226 may operate from a central office or headquarters of the MFI 104 and may design microfinance loan products. Field MFI users 224 may be in direct contact with borrowers 108 for loan origination and verification purposes. Field MFI users 224 may use any kind of network device, however, the use of mobile phones, mobile computers and/or personal digital assistants may ease access while the field MFI users 224 are in the field, or "at the end of the dusty road" interacting with borrowers 108. Because the MFI interface 210 may be provided to mobile devices, it may allow field MFI users 224 to utilize various other mobile functionalities while in the field. For example, the MFI uses 224 communication device may also include applications showing supplier databases showing price, inventory, pictures, etc. of intervention technology products, verification route optimization functionality, payment by a remote purchaser (e.g., allowing a third party such as a family member to make payments on a loan) and instant loan approval (e.g., from a potential installation location utilizing the automatic bid approval functionality described below). These applications may be provided via the interface 210 or via third party products. It will be appreciated that the respective tasks of the MFI users 224, 226 described herein may be performed by a single MFI user or may be divided between additional MFI users in any suitable way.

Credit firm users 228 may access the credit tracker system 202 via a credit firm interface 214 to view data about credits purchased by their respective credit firm 106 such as, for example, data describing the verification and auditing of those credits. Retail users 220 may access the credit via a retail interface 216 in order to purchase credits.

Figure 3:
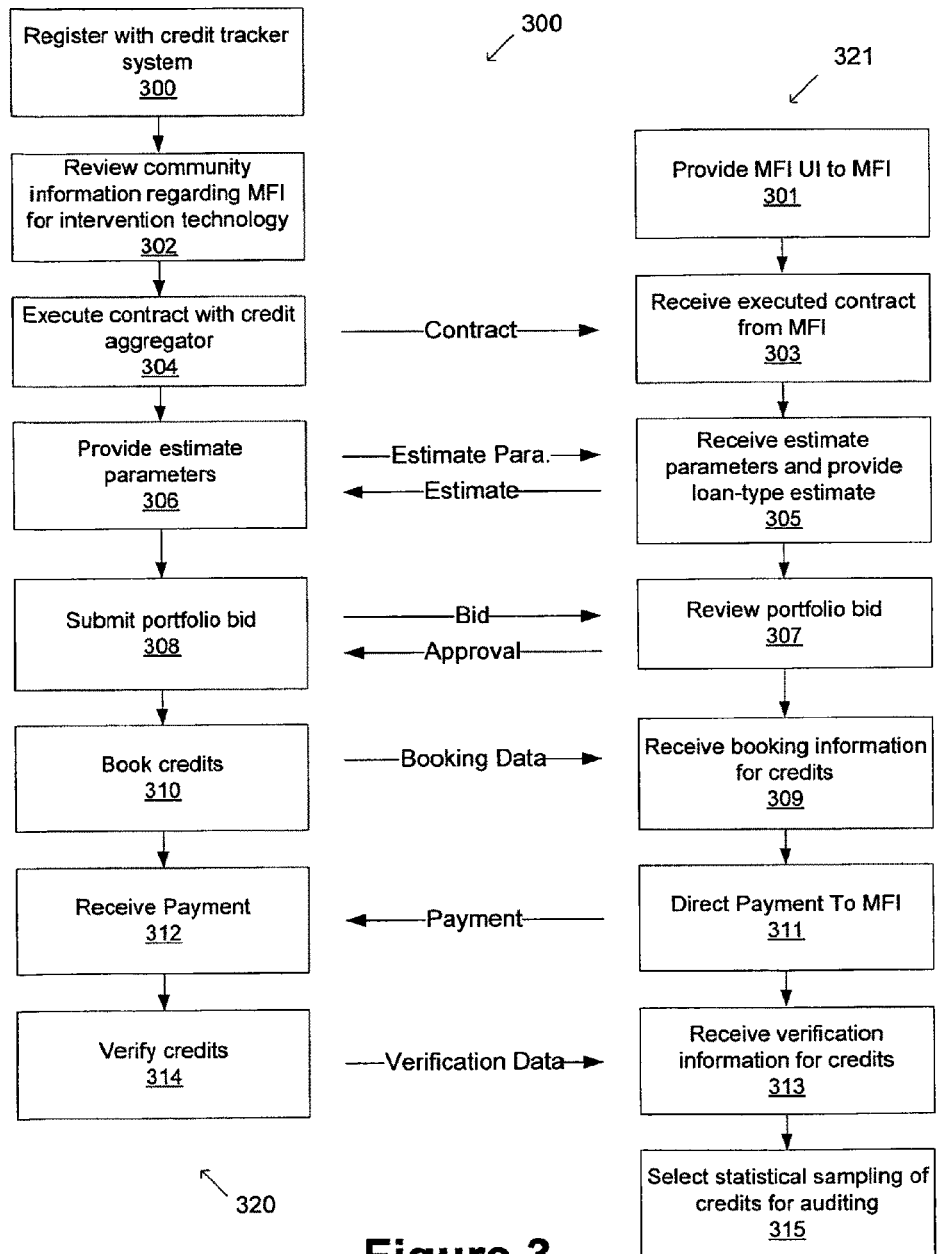
FIG. 3 is a process flow illustrating one embodiment of a process flow for an example transaction between an MFI and the credit aggregator.

FIG. 3 is a process flow illustrating one embodiment of a process flow 350 for an example transaction between an MFI 104 and the credit aggregator 102. Boxes in column 320 denote actions taken by the MFI 104, while boxes in column 321 denote actions taken by the credit aggregator 102. The credit aggregator 102, via the system 202, may provide the MFI interface 210 to the MFI 104 via an MFI user 224, 226 (step 301). According to various embodiments, some or all of the MFI interface 210 may be configured to be viewed by an MFI user 224, 226 with a mobile device, such as a mobile phone; personal digital assistant, netbook, etc. For example, the MFI interface 210 may be primarily text-based with minimal graphics.

Figure 5:
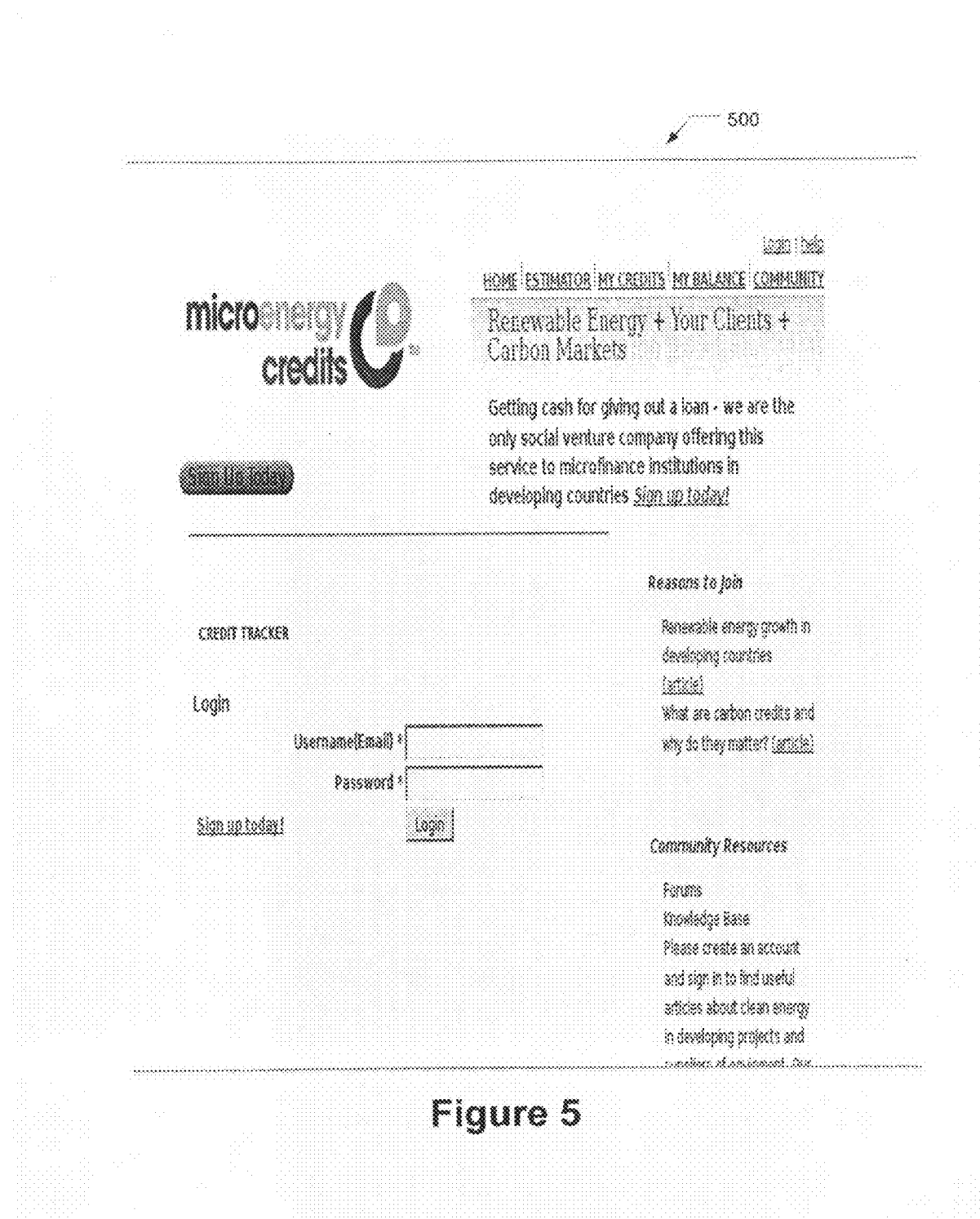
FIG. 5 illustrates a screen shot of one embodiment of a screen provided to an MFI user according to the MFI user interface shown in FIG. 2 to log-into the interface

When an MFI user 224, 226 accesses the MFI interface 210 for the first time, it may be necessary for the MFI user 224, 226 to register with credit tracker system 202 (step 300). FIG. 4 illustrates a screen shot of one embodiment of a screen 400 provided to an MFI user 224, 226 according to the MFI user interface 210 to register the user 224, 226 with the system 202. The MFI user 224, 226 may provide various information with their registration including, for example, a name an e-mail address, a password, a name of the MFI 104 for which they work, a number of active borrowers of the MFI 104, a size of the MFI's gross portfolio in the past year, whether the MFI 104 has a profile at a clearinghouse such as the MIX MARKET, a website, if any, of the MFI 104, the MFI's country of operation, and a notes section. Registration information about the MFI and the particular MFI user being registered may be stored by a Customer Resource Management (CRM) engine 211 at an account or CRM database 234 (e.g., implemented by one or more memory circuits, hard drives, etc.). It will be appreciated that more or less registration information may be required. According to various embodiments, an MFI 104 may register one MFI user or multiple users 224, 226. A registered MFI user 224, 226 may log-into the MFI interface 210 utilizing a standard log-in function. For example, FIG. 5 illustrates a screen shot of a screen 500 provided to an MFI user 224, 226 according to the MFI user interface 210 to log-into the interface 210. The screen 500 may comprise fields for receiving from the MFI user 224, 226, a user name and/or e-mail and a password.

According to various embodiments, an MFI user 224, 226 may provide information about their respective MFI 104 that may be used, for example, to review and approve loan portfolio bids. This information may be required from every MFI user 224, 226 to register, or only from the first MFI user 224, 226 to register from a given MFI 104. Generally, the requested information may describe the MFI 104 and may particularly describe financial variables regarding the MFI 104 and its past experience, if any, with loans that generate energy or other social credits. Table 1 below shows an example set of questions that may be presented to an MFI user 224, 226 upon registration. The resulting information, for example, may be stored at the account database 234, for example, at an entry related to the MFI 104.

| Question | Answer Form |
|---|---|
| 1. Do you have a clean energy division or product line? | Yes/No |
| (a) What technologies? | Please Describe |
| (b) How many loans per year? | Please Describe |
| 2. If you do not have a specific energy division or product line, do your clients sometimes use loans to purchase clean or energy efficient investments? | Yes/No - Please Describe |
| 3. Approximately what percent of your clients have electric grid access in their homes and businesses? | <25% 25-50% 50-75% >75% |
| 4. Approximately what percent of your clients use a traditional fuel for cooking (e.g., wood, charcoal or dung, etc.)? | <25% 25-50% 50-75% >75% |
| 5. Have your clients requested loans for clean or efficient energy technologies? | Yes/No - Please Describe |
| 6. Do you, or have you ever worked with a renewable or clean energy distributor? | Yes/No - Please Describe |
| 7. Do you or have you ever worked with a government, development bank or donor agency to provide clean or efficient energy to your clients? | Yes/No - Please Describe |
| 8. Are you interested in learning more about clean and efficient technologies your clients may benefit from? | Yes/No - Please Describe |
| 9. Are you interested in any of the following types of support for your clean energy program? (a) Interchange with other MFIs with energy divisions/product lines (b) Technical assistance (c) Seed (grant) funding (d) Loan capital (e) Linkages with local energy suppliers (f) Ratings and standards for energy systems and equipment (g) Case studies and other knowledge objects about clean energy | Please check all that apply: |
| (h) Other | Please Describe |

Figure 6:
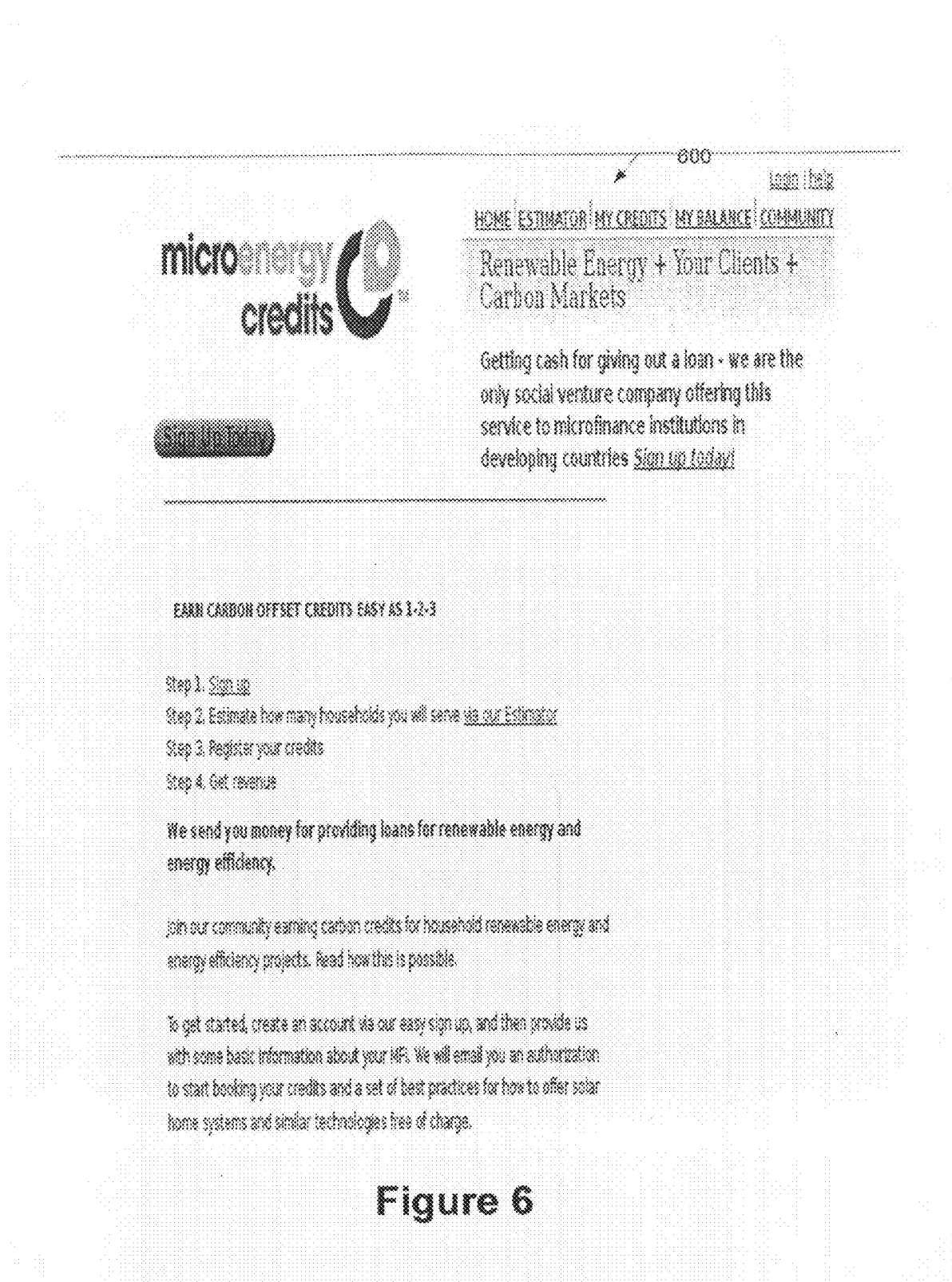
FIG. 6 illustrates a screen shot of one embodiment of a screen provided to an MFI user according to the MFI user interface shown in FIG. 2 providing links to a step-by-step instruction set for initiating a credit portfolio.

Referring back to the process flow 350, the MFI user 224, 226 may review community information available via the MFI interface 210. The community information may include information useful to an MFI 104 that is attempting to begin a microfinance loan portfolio generating social credits. For example, community information may include information describing how to get a credit portfolio up and running. According to various embodiments, the community information displayed to a particular MFI 104 may be tailored based on their responses to questions, such as those set forth in Table 1 above. FIG. 6 illustrates a screen shot of a screen 600 provided to an MFI user 224, 226 according to the MFI user interface 210 providing links to a step-by-step instruction set for initiating a credit portfolio. In various embodiments, the community information may also include public articles on the microfinance and/or credit aggregations processes and/or case studies of other MFI's that have successfully operated credit portfolios. Forums may be provided that allow MFI users 224, 226 from different MFI's 104 to interact with one another and with representatives of the credit aggregator 102 (e.g., administrative users 222). In various embodiments, a help desk knowledge base may also be provided. The help desk knowledge base may be generated by various MFI users 224, 226 and/or administrative users 222 as a wiki.

Additional resources may include a financing help resource site with information regarding means and methods of obtaining capital to begin a microfinance loan portfolio. Terms and conditions governing a sale of MFI-generated social credits to the credit aggregator 102 (e.g., including a privacy policy) may be provided and may allow the MFI user 224, 226 to gauge the impact of selling credits to the aggregator 102. For arrangements where the MFI 104 provides the intervention technology directly to the borrower, a supply chain portal may be provided as a part of the MFI interface 210. The supply chain portal may comprise information regarding different intervention technologies including, for example, specifications, prices, rating information, links to suppliers, etc. According to various embodiments, the community information provided to MFI users 224, 226 via the MFI interface 210 may be stored by the system 202 at a community database 230.

Referring back to the process flow 350, if the MFI 104 has not already done so, the MFI user 224, 226 may execute a contract with the credit aggregator 104 and electronically transmit the executed contract to the credit aggregator 102 via the credit tracker system 202 and MFI interface 210 (step 304). For example, the contract may be provided as a page (not shown) of the MFI interface 210 that the MFI user 224, 226 may fill out and submit. The MFI 102 may receive the contract and counter-sign (step 303). For example, the received contract may be provided to an administrative user 222 via the administrative interface 212. The administrative user 222 may countersign the contract, or pass the contract on to a party at the credit aggregator 102 authorized to do so (e.g., an officer of the credit aggregator 102). The counter-signed contract may be stored, for example, at an account database 234 of the credit tracker system 202 at an entry for the MFI 104. According to various embodiments, the counter-signed contract may be returned to the MFI 104 and/or made accessible to the MFI 104 via the MFI interface 210.

The MFI interface 210 may also provide the MFI users 224, 226 with access to the functionality of the credit calculator engine 204 for the purpose of estimating credits and resulting revenue that the MFI 104 would receive from loans of a particular type. The MFI user 224, 226 may provide the credit tracker system 202 with estimate parameters (step 306). The credit tracker system 202 may receive the parameters (step 305) and utilize the credit calculator engine 204 to generate an estimate and provide the estimate to the MFI user 224, 226. According to various embodiments, the estimate parameters may be defined by one or more templates. For example, estimate parameter templates may be specific to credit types (e.g., carbon offset, MDG, etc.) intervention technology types, and geographic locations. Estimate parameters for a given credit type, and algorithms for calculating the credits, may be defined by treaties and/or commercial agreements. For example, carbon credit markets may have rules that define the parameters of carbon offset credits to be traded. Also, for example, the definition of an MDG credit may be defined by the United Nations, which defined the Millennium Development Goals. According to various embodiments, the credit calculator engine 204 may consider multiple credit methodologies. For example, over time, credit definitions may change. The credit calculator engine 204 may retrieve updated credit definitions, for example, from publicly available sources. In addition, the credit calculator engine 204 may mine data from previously executed carbon offset projects that have been made public. The credit calculator engine 204 may apply these rules, definitions and case studies to determine a number of credits (carbon and otherwise) associated with an installation. A value of the resulting credits may be found, for example, with reference to markets where the credits are sold.

The estimate parameters considered by the credit calculator engine may comprise any suitable data that is necessary or desirable to the credit calculator engine 204 for finding a number of credits or a value of credits. For example, estimate parameters may comprise information regarding the intervention technology. This information may include technical data and specifications including, for example, tables of efficiency data for different models, etc. According to various embodiments, the MFI user 224, 226 need only identify the intervention technology type. The engine 204 maybe configured to retrieve more detailed data automatically, for example, from the community database 230. Estimate parameters may also comprise data describing baseline technology that is to be replaced by the intervention technology. This information may be directly received from the MFI user 224, 226, or may be derived from an installation location. The estimate parameters describing the intervention technology and the baseline technology may allow the credit calculator engine 204, for example, to find carbon reductions that may qualify as carbon reduction credits.

Other estimate parameters may describe energy-related economic conditions near the installation location. Again, this data may be received from the MFI user 224, 226, or from other sources based on an indication of the installation location. Such installation location parameters may include, for example, a socio-economic description of the households who will benefit from the intervention, the source of biomass (e.g., for a biomass digester), typical energy use patterns and deforestation rates, carbon intensities of the local energy sector, average household energy consumption, etc. The estimate parameters related to installation location may allow the credit calculator engine 204 to determine if non-carbon credits (e.g., MDG credits, biodiversity credits, etc.) will accrue from the intervention technology and may also allow the credit calculator engine 204 to determine if any of the carbon or other credits are social carbon credits.

Many carbon markets and carbon firms are willing to pay a premium for carbon credits that are considered to have additional social benefits. For example, if the revenue of the carbon credit, and the resulting reduction in the price of the intervention technology, allows a borrower 108 to afford an intervention technology that they otherwise would not have, a carbon credit may be considered a social carbon credit. Accordingly, the estimate parameters may include an indication from the MFI user 224, 226 of whether the price offset in the intervention technology due to the carbon credit made the borrower 108's purchase possible. This, along with socio-economic data regarding the installation location, may be used to determine whether carbon credits are considered to have additional "social benefits." It will be appreciated that different parameters may be required and/or desired to further classify carbon reduction credits according to the definitions of relevant markets and/or firms. According to various embodiments, the estimate parameters may include additional information allowing the credit calculator engine 204 to find the amounts and values of other credits generated by the installation of the intervention technology including, for example, MDG credits, biodiversity credits, free trade credits, etc.

Additional estimate parameters may allow the credit calculator engine 204 to determine additional factors affecting the number and value of credits generated by the proposed installation of the intervention technology. For example, many carbon markets and carbon firms require an indication of additionality to validate a carbon offset credit. Additionality may be an indication of whether the microfinance loan is the "but-for" cause of the installation of the intervention technology. For example, if a borrower 108 were going to purchase an intervention technology regardless of whether they received the loan from the MFI 104, then no credit may accrue. Accordingly, the estimate parameters may include an indication from the MFI user 224, 226 of whether the borrower 108 would have purchased the intervention technology without the loan. For example, the MFI 104 may be asked whether the borrowers 108 would have been able to afford the intervention technology without the credits based on their income. The MFI's 104 may show additionality in other ways including, for example, by a showing that the borrowers 108 would not have known about the technology without education efforts by the MFI 104, a showing that the MFI 104 has created a supply chain to a location where the technology was not otherwise available, etc. In addition, an indication of the permanence of the intervention technology (e.g., the expected lifetime of the device) may be received, for example, to estimate credits over the lifetime of the technology.

Figure 7:
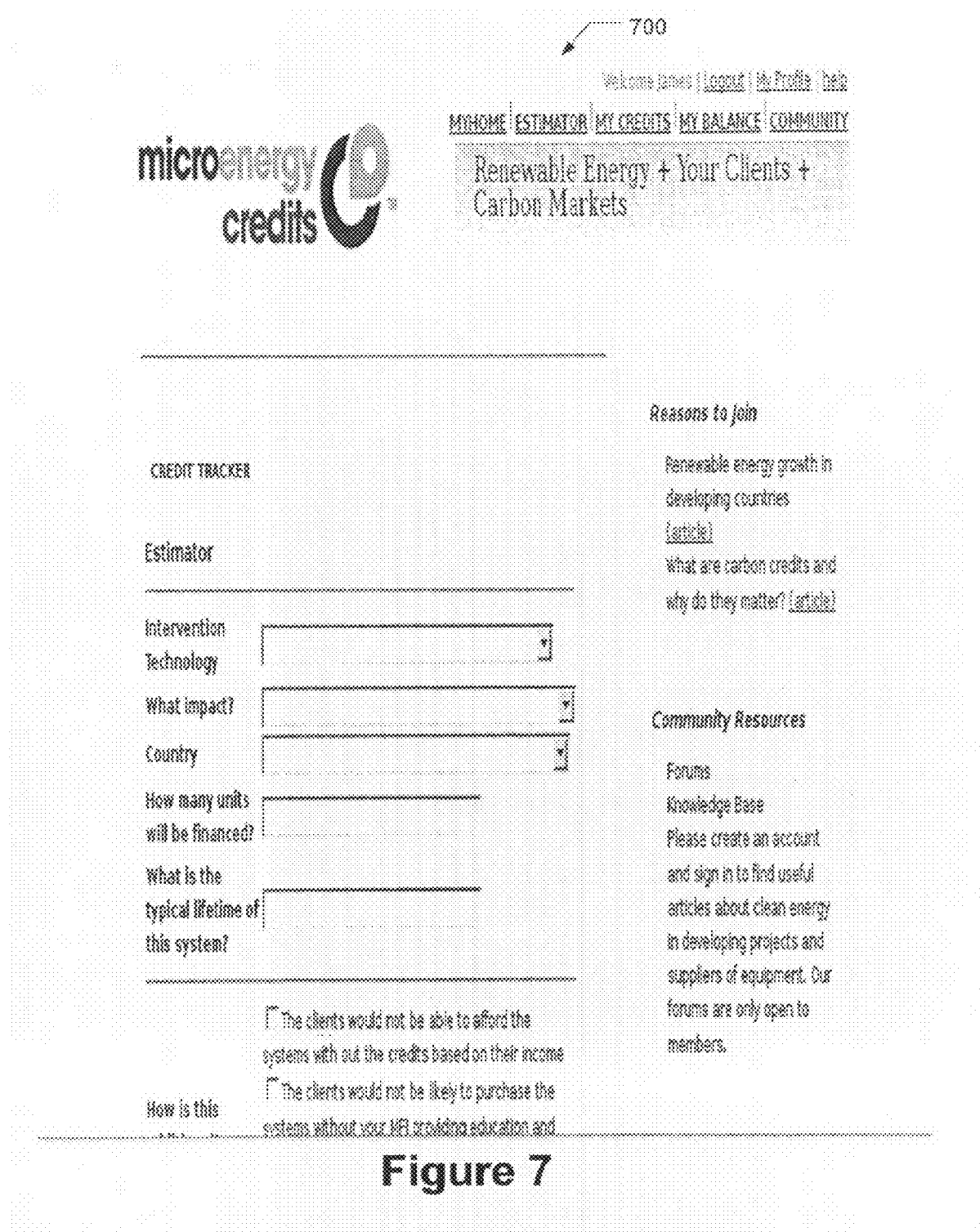
FIG. 7 illustrates a screen shot of one embodiment of a screen provided to an MFI user according to the MFI user interface shown in FIG. 2 for receiving estimate parameters.

FIG. 7 illustrates a screen shot of a screen 700 provided to an MFI user according to the MFI user interface 210 to receive estimate parameters. The screen 700 may comprise a field 702 for receiving an indication of the intervention technology. According to various embodiments, the specific intervention technology may be selected from a drop-down menu. A field 704 may be for receiving from the MFI user 224, 226 an indication of the impact of the intervention technology. The country where the intervention technology is to be installed may be indicated at field 705. A field 706 may be for receiving an indication of how many units will be financed as a part of the loan portfolio. A typical lifetime of the intervention technology system may be received at field 708. Additional fields (not shown) may receive additional estimate parameters including, for example, an indication of whether the borrower 108 could have afforded the intervention technology without the credits (e.g., to determine whether the carbon credit is a social credit) and an indication of whether the borrower 108 would have been able to afford the technology without the loan (e.g., to determine additionality).

When the estimate parameters are received by the credit tracker system 202 (e.g., via the MFI interface 210), the credit calculator engine 204 may generate the estimate of the amount and value of the resulting credits. This information may be returned to the MFI user 224, 226 via the network 206. This may help the MFI user plan loan types to accurately set prices for borrowers 108 and/or obtain a suitable amount of capital to fund the loans. According to various embodiments, an MFI user 224, 226 may access the estimator functionality before registering with the system. In this way, MFI's 104 may receive an indication of the benefits that can be obtained from working with the credit aggregator 102 prior to registering.

Referring back to the process flow 350, the MFI 104 (e.g., via MFI users 224, 226) may submit a portfolio bid (step 308) to the credit aggregator 102 (e.g., via the system 202 and MFI interface 210). The portfolio bid may comprise data allowing the credit calculator engine 204 to calculate the quantity and value of social credits resulting from the intervention technology installation (e.g., similar or identical to the estimate parameters). In addition, the portfolio bid may comprise information describing the MFI 104. For example, the portfolio bid may comprise data describing whether the MFI 104 is an acceptable credit risk to the credit aggregator 102.

When the portfolio bid is received via the MFI interface 210, the credit tracker system 202 may automatically determine whether the bid will be accepted (e.g., utilizing the bid review engine 206). Portfolio bids may be reviewed and approved automatically according to an algorithm executed by the bid review engine 206, or manually (e.g., via an administrative user 222). For example, the bid review engine 206 may consider information about the MFI 104, information about the proposed loan portfolio and information about the demand for credits. Information about the MFI 104 may be provided by the MFI 104 (e.g., via the registration process as shown above with reference to Table 1). Information about the MFI 104 may also be gleaned from publicly available sources such as, for example, MIX MARKET profiles and online data sets. In addition, information about MFI's 104 that have previously worked with the credit aggregator 102 may be pulled from the account database 234. Information about the proposed loan portfolio may be received from the MFI 104 and may be similar to the estimate parameters described above. Information about the demand for credits may be received from various places. For example, the credit aggregator 102 may have contractual relationships with one or more carbon firms 106 or other credit firms. These contractual relationships may establish a number and/or value of credits that each firm 106 is willing to purchase. Additional demand information may be gleaned from market queues such as price, trading volume, etc.

When reviewing bid data, the bid review engine 206 may first assign a score to the MFI 104. For example, the engine 206 may compare the self-descriptive information received from the MFI 104 for consistency with publicly available information about the MFI 104. Inconsistencies between self-reported information about the MFI 104 and publicly available information may reduce the MFI's 104 score and, if above a predetermined threshold, may cause the bid to be denied. The bid review engine 206 may also determine whether the MFI 104 has done business with the credit aggregator 102 before. If so, and if the MFI's 104 account is in good standing, the MFI's 104 score may be increased. The MFI score may additionally be based on industry standards regarding financial stability, for example, based on publicly available statements and other data. Geographic location may also be taken into account in determining the MFI's 104 score. For example, MFI's 104 that lend in countries that are known to have lax regulation and/or enforcement regarding finance institutions may be assigned a lower score.

In addition to assigning a score to an MFI 104, the bid review engine 206 may generate a demand-based score for the proposed loan portfolio. This may involve comparing the credits to be generated by the portfolio to the demand for the credits on the relevant markets 112, 110, 114, 116. If there is not sufficient demand for the generated credits, the bid may be scored poorly. Also, for example, the bid review engine 206 may generate a portfolio score for the bid considering the size of the proposed portfolio relative to the perceived geographic demand and relative to the size and previous experience of the MFI 104. For example, if the bid is a large bid in a geographic or technological area where the MFI 104 lacks previous experience, the size score of the bid may be reduced. Also, for example, if the bid is much larger than any previous portfolios of the MFI 104, the portfolio score may be reduced. In addition, a match between the proposed technology and geographic factors such as climate, existing energy infrastructure, etc. may be factored into the portfolio score. For example, if the bid proposes to finance solar lights in an area where clean hydroelectric power is plentiful, the portfolio score may be lowered. After the MFI score, the demand score and the portfolio score are assigned, the bid review engine 206 may approve or deny the bid considering the various scores.

In some embodiments, portfolio bids may be reviewed and approved manually. In these embodiments, for example, the bid review engine 206 may gather and present relevant information to the administrative user 222 (e.g., via the administrative interface 212). The value of credits resulting from the portfolio may be calculated, for example, by the credit calculator engine 204. Also, for example, the bid review engine 206 may gather information regarding the MFI 104. Such information may be received from the MFI 104 and/or may be found at publicly available sources such as the MIX MARKET. Based on this information, the administrative user 222 may determine whether to approve the portfolio bid.

Figure 8:
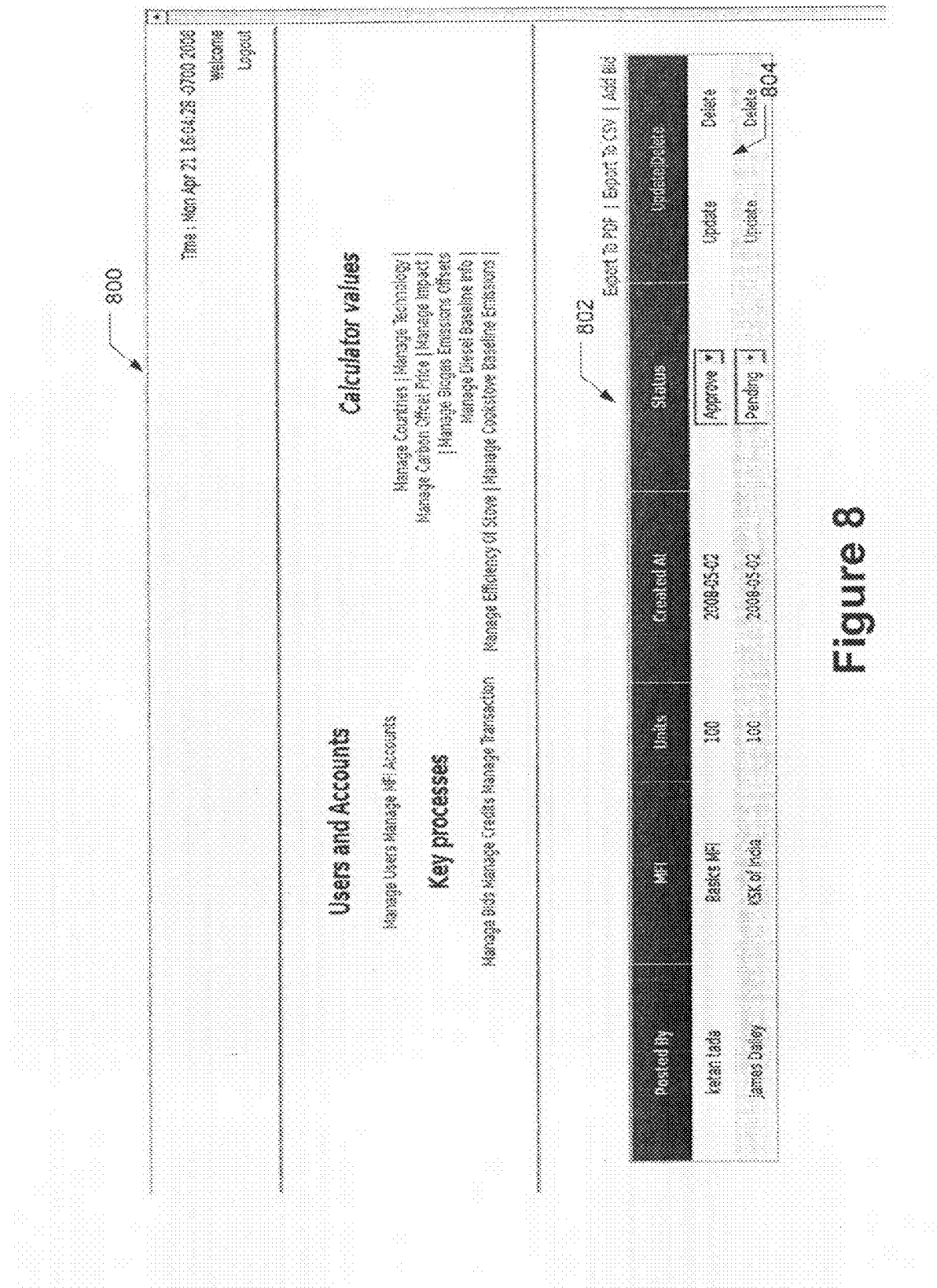
FIG. 8 illustrates a screen shot of one embodiment of a screen provided to an administrative user according to the administrator interface shown in FIG. 2 for receiving an approval or rejection of a portfolio bid.

The decision of the administrative user may be received via the administrative interface 212. FIG. 8 illustrates a screen shot of a screen 800 provided to an administrative user 222 according to the administrator interface 212 for receiving an approval or rejection of a portfolio bid. The screen 800 may comprise information about pending portfolio bids including, for example, the name of an MFI user 224, 226 who posted the bid, a name of the MFI 104, a number of units, and a creation date. A field 804 may allow the administrative user 222 to update and/or delete a portfolio bid. A status field 802 may allow the administrative user 222 to manually approve or reject a portfolio bid. Upon approval of a bid portfolio, either manually or automatically, the credit tracker system 202 (e.g., via the bid review engine 206), may create an addendum to the contract between the credit aggregator 102 and the MFI 104. The addendum may set forth the terms and conditions of the approved bid.

When a portfolio bid has been approved by the credit aggregator 102, the MFI 104 may begin to extend financing to borrowers 106 which may, according to various embodiments, involve purchasing and installing the intervention technology. According to various embodiments, the credit aggregator 102 may provide services to the MFI 104 making it easier for the MFI 104 to obtain financing to implement the portfolio. For example, the MFI interface 210 may include links to sources of capital who are willing to lend to MFI's. In some embodiments, the credit aggregator 102 may provide capital directly to the MFI 104.

Figure 9:
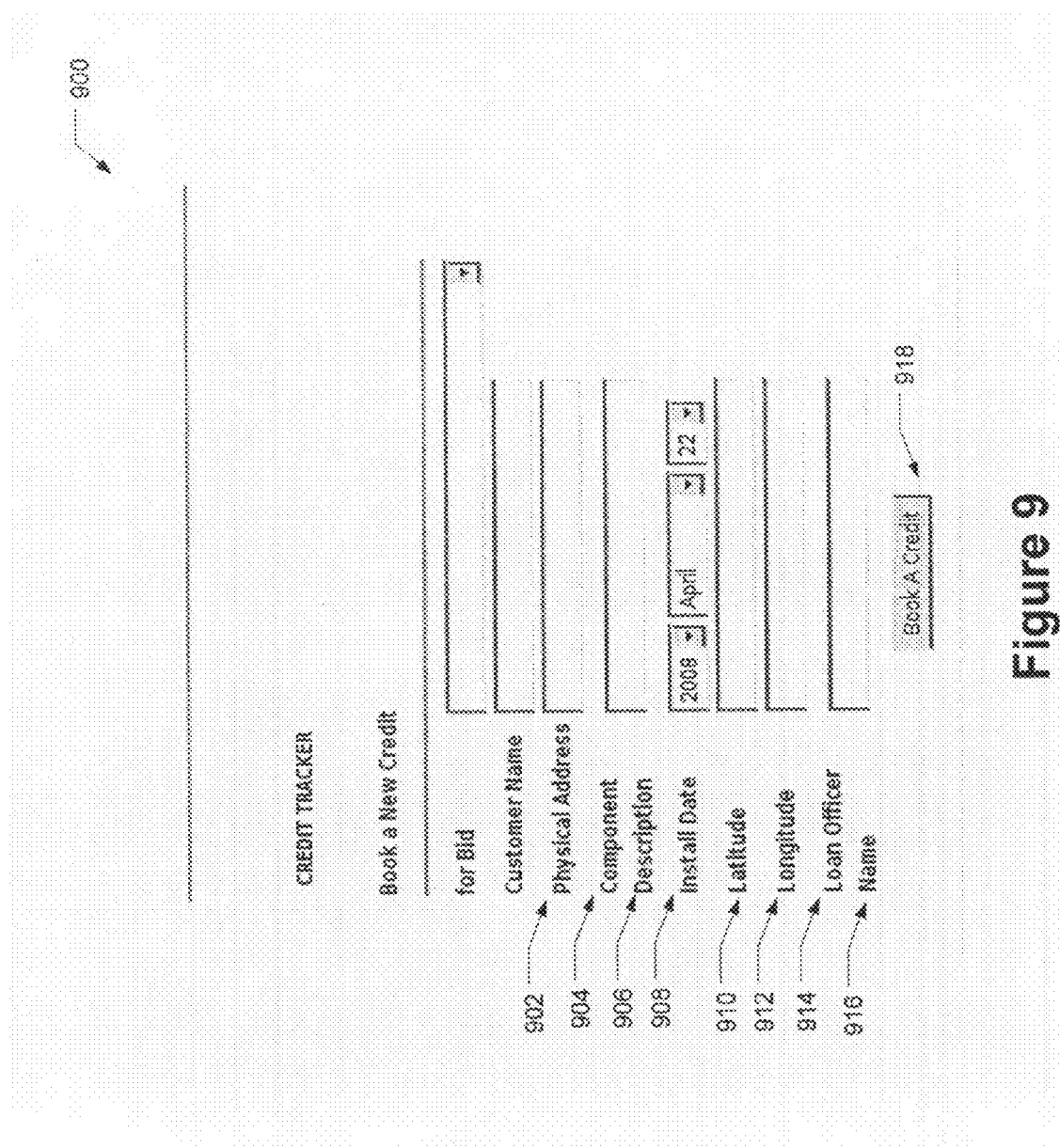
FIG. 9 illustrates a screen shot of one embodiment of a screen provided to an MFI user according to the MFI user interface shown in FIG. 2 to receive installation information.

Upon the installation of intervention technology, an MFI user 224, 226 may book the associated credits (step 310) (e.g., as calculated by the credit calculator engine). Booking credits may involve providing booking data to the credit aggregator 102, via the MFI interface 210. The booking data may specifically identify the MFI 104 (e.g., via a unique tracking number), an installation site, the intervention technology installed, the installation date, and other information about the installation. According to various embodiments, credits may be booked by a field MFI user 224 in the field using a mobile phone or other mobile device to access the credit tracker system 202. FIG. 9 illustrates a screen shot of one embodiment of a screen 900 provided to an MFI user 224, 226 according to the MFI user interface 210 to receive booking data. The screen 900 may be primarily text based, making it easier for field MFI users 224 to view and use the screen 900 from their mobile phones or other mobile devices. A bid field 902 may receive an identification of a portfolio bid that the booking is a part of. A customer name field 904 may receive the name of the borrower 108. A physical address field 906 may receive a physical address of the installation. The physical address may be an address or other location indication that would be recognized by the borrower 108 and/or the MFI user 224. A component description field 908 may receive a description of the intervention technology. An installation date field 910 may receive information regarding a date when the intervention technology was installed. Latitude and longitude fields 912, 914 may receive the latitude and longitude of the installation site. This information may be available to a field MFI user 224 at the installation site, for example, from a Global Position System (GPS) device. Also, the MFI user 224 may utilize a mobile phone or other communication device with GPS capability. According to various embodiments, the MFI interface 210 may be configured to interrogate the communications device of the field MFI user 224 to automatically derive the latitude and longitude and populate the fields 912, 914. A field 916 may receive a name of the loan officer (e.g., the field MFI user 224) who is booking the credit. It will be appreciated that booking data may include more or less information that is indicated by the screen 900. For example, in various embodiments, the MFI 104 may provide a photograph of the installation as part of the booking data. When the screen 900 is completed, the MFI user 224 may select the Book A Credit button 918, or other similar button or link, to transmit the booking data to the credit tracker system 202 via the network 206.

Upon receipt of the booking data for an installation (step 309), the credit tracker system 202 (e.g., via the verification/audit engine 208) may verify the credits associated with the booking. For example, the verification/audit engine 208 may be configured to review the booking data to ensure additionality (e.g., that the reported installation is not redundant with another installation in the system). Various other parameters may be verified including, for example, whether the bid is still open, etc. When booking data is verified, the verification/audit engine 208 may generate an entry for the installation at installation database 232. The entry may include the booking information, an indication of any credits generated by the installation, and any other information about the installation. In addition, the verification/audit engine 208 may schedule periodic verification dates for the installation and send an indication of the verification dates to the MFI 104 via the network 206 (e.g., monthly, quarterly, etc.).

When an installation has been booked, the credit aggregator 102 may direct payment to the MFI 104 for any credits associated with the installation (step 311). In some embodiments, however, payment may be delayed until the MFI 104 has verified the credits according to the predetermined schedule, for example, as described herein below. Also, for example, payments to an MFI 104 may depend on the MFI's 104 audit status. For example, if an MFI's 104 portfolio has been downgraded by an audit, payments may be delayed or reduced.

Figure 10:
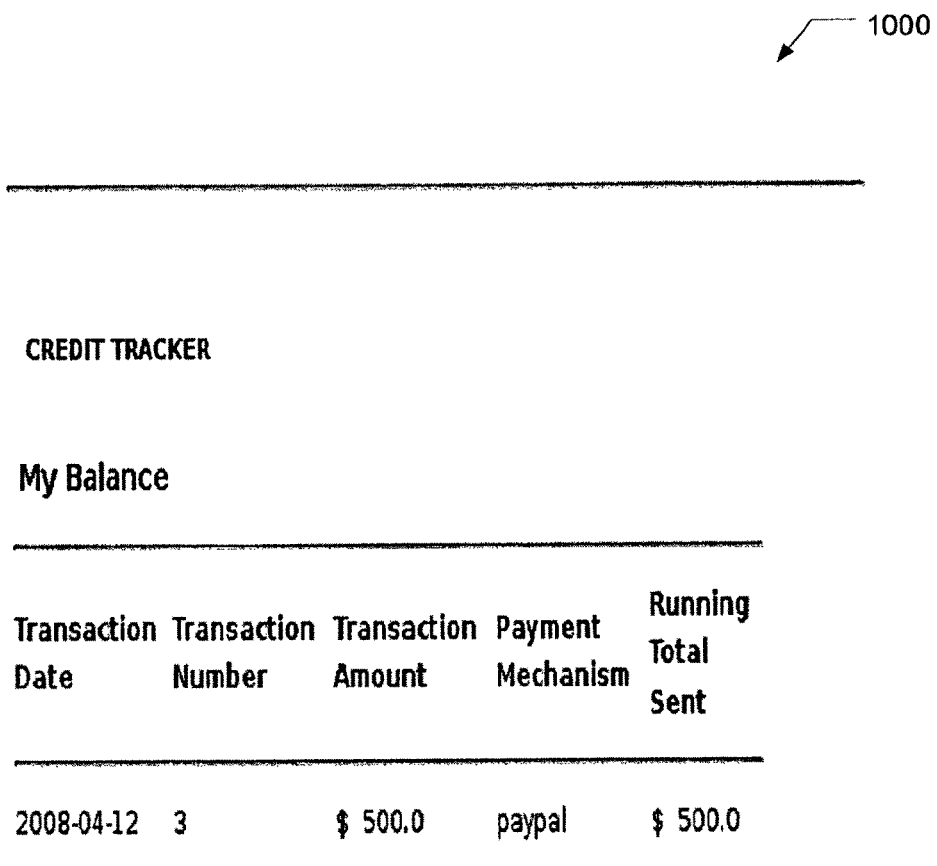
FIG. 10 illustrates a screen shot of one embodiment of a screen provided to an MFI user according to the MFI user interface shown in FIG. 2 to review and track payments from the credit aggregator to the MFI.

When a payment is sent, the MFI 104 may receive the payment (step 312). The payment may be directed according to any suitable method including, for example, wire transfer, physical checks, an Internet bank or money service such as PAYPAL, etc. Payments may be reported to the MFI 104 via the MFI interface 210. For example, FIG. 10 illustrates a screen shot of one embodiment of a screen 1000 provided to an MFI user 224, 226 according to the MFI user interface to review and track payments from the credit aggregator 102 to the MFI 104. For example, the screen 1000 illustrates a transaction date, a transaction number, a transaction amount, a payment mechanism and a running total sent (e.g., the gross proceeds from all of the MFI 104's credits).

According to various embodiments, the credit aggregator 102 may direct payment to the MFI's 104 not after every credit is booked, but periodically (e.g., monthly, quarterly, etc.). In some embodiments, the credit aggregator 102 may direct payment to an MFI 104 when its balance has exceeded a predetermined amount. Each payment to an MFI 104 may be assigned a unique transaction number. Accordingly, the transaction may be captured by an account system (not shown) of the credit aggregator 102 such as, for example, QUICKBOOKS or INTACCT and/or stored at the account database 234. Periodically (e.g., weekly, monthly, etc.), an administrative user 222 may access payment information (e.g., at the account database 234) and reconcile the accounts of the various MFI's 104. According to various embodiments, however, the reconciliation process may be automatic.

Figure 11:
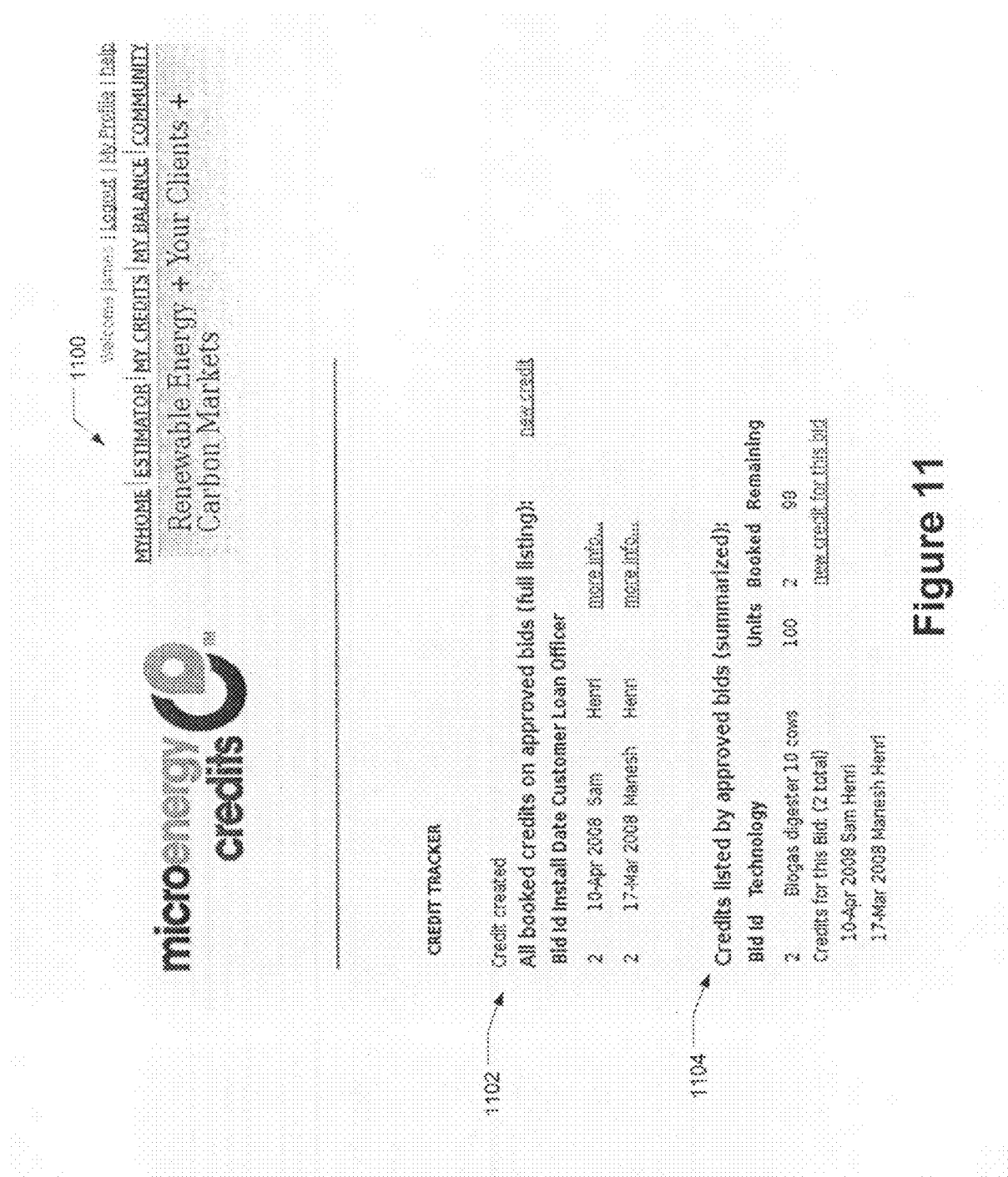
FIG. 11 illustrates a screen shot of one embodiment of a screen provided to an MFI user according to the MFI user interface to review submitted portfolio bids.

It will be appreciated that the MFI users 224, 226 may be provided with various additional screens of the MFI interface 210 that allow the MFI users 224, 226 to track the status of various bids, bookings and payments. For example, FIG. 11 illustrates a screen shot of one embodiment of a screen 1100 provided to an MFI user, 224, 226 according to the MFI user interface 210 to review submitted portfolio bids. The screen 1100 may comprise a field 1102 listing booked credits in approved bids and a field 1104 listing approved bids that have not been fully booked. The MFI user 224, 226 may view additional details of a specific bid and/or installation by selecting the entry associated with the bid. FIG. 12 illustrates a screen shot of one embodiment of a screen 1200 provided to an MFI user 224, 226 according to the MFI user interface 210 showing additional details of a set of previously booked credits from an installation.

Referring back to the process flow 350 of FIG. 3, the MFI 104 may periodically verify the operation of the intervention technology, for example, to make sure that any carbon or other credits generated are still valid. This may involve sending a field MFI user 224 to the installation site to personally verify the status of the intervention technology and therefore the status of the resulting credits (step 314). The field MFI user 224, for example, using a mobile phone or other mobile communication device, may transmit verification data to the credit tracker system 202 via the MFI interface 210. FIG. 13 illustrates a screen shot of one embodiment of a screen 1300 provided to an MFI user 224, 226 according to the MFI user interface to verify existing installations. For example, the verification data may include information identifying the installation, which may be, for example, the same as the booking information. In addition, the MFI field officer user 224 may provide data describing, a date of the verification, a current operational condition of the intervention technology, an indication of whether and to what extent the intervention technology is being used, and other notes. For example, predefined categories may be set for defining the state of operation of the intervention technology including, for example, not working, working and partially working. The MFI interface 210 may also be configured to show the MFI user 224 the most recent status information regarding the installation. According to various embodiments, the MFI interface 210 may be integrated with a loan booking system of the MFI 104, allowing the MFI 104 to track the verification process internally.

The verification/audit engine 208 may receive the verification data (step 313) and store it at an entry of the installation database 232 corresponding to the installation being verified. The verification/audit engine 208 may also determined, based on the verification data, whether the credits resulting from the installation are still valid at the same value that they were at installation. For example, if the intervention technology is not being used, or is not being used at full capacity this may indicate leakage (e.g., a replacement of the intervention technology with less environmentally-friendly technology). If leakage is detected, the verification/audit engine 208 may accordingly reduce the number and/or the value of credits resulting from the installation and also the compensation to the MFI 104. Likewise, if the intervention technology is not in proper working order, this may indicate a lack of permanence. Credits may likewise be reduced or re-valued.

In addition to verification by the MFI's 104, the credit aggregator 102 may periodically hire an independent in-country auditor to audit the installations and resulting credits (e.g., once per year). For example, the verification/audit engine 208 may generate a statistically significant sample of the installations from each MFI 104 (step 315). According to various embodiments, auditor users (not shown in FIG. 1) may be provided with access to the MFI interface 210, or a version thereof, allowing the auditor users to access location (i.e., GPS data) and other information about the installations to be audited, for example, via a mobile device. The outside auditor may visit each of the selected installation sites to verify that the intervention technology is operational and being used. Based on the auditor's report, the portfolio of the MFI 104 may be rated, and its credits priced accordingly. According to various embodiments, the outside auditor may be given access to the installation database 232 and may select their own statistically significant sample of MFI 104 installations. The outside auditor may be any suitable auditor including, for example, the GOLD STANDARD.

When credits have been booked, the credit aggregator may automatically package the credits into lots and sell to carbon firms 106 or other credit dealers. An aggregation engine 209 of the credit tracker system 202 may generate lots of verified credits. For example, the aggregation engine 209 may generate a lot of credits considering the current status of the credits. If some of the credits in a given lot are downgraded (e.g., due to an unfavorable audit of the MFI 104, or an unfavorable verification report), the aggregation engine 209 may either downgrade the value of the lot sold, or may replace diminished credits with other credits purchased by the credit aggregator 102 (e.g., from different MFI's 104) and/or may include additional lower-value credits so that the total value of the lot to the purchaser remains the same. A credit firm user 228 may be an employee or other representative of the carbon firm 106, and/or another type of credit firm and may access the credit tracker system 202 via a credit firm interface 214. According to various embodiments, credit firm users 228, according to various embodiments, may be given access to all or a portion of the installation database 232. For example, credit firm users 228 may be provided with access to the entries in the installation database 232 corresponding to credits that have been, or will be purchased by their associated credit firm.

In addition to selling credits to firm purchasers (e.g., carbon firms 106), the credit aggregator 102 may, in various embodiments, sell credits to retail users 220. For example, retail users 220 may wish to purchase carbon credits to offset their own carbon dioxide generating activities. Retail users 220 may also wish to purchase other types of credits (e.g., MDG credits, etc.) as a form of charitable contribution. The retail interface 216 may provide retail users 220 with functionalities for purchasing credits. For example, the retail interface 216 may include a carbon calculator that is configured to receive from a retail user 220 data describing the user 220's lifestyle (e.g., commute distance, average monthly utility bills, etc.). From this information, the calculator may generate a number of carbon credits that the user should purchase to offset their footprint. The retail interface 216 may also provide retail users 220 with functionality to browse through available credits and associated countries, intervention technologies and/or other factors. Different credits having different characteristics may be priced based on demand.

As described above, the administrator interface 212 may be configured to allow administrative users access to the credit tracker system 202 in order to perform various administrative tasks. For example, certain administrative users 222 may administer the credit calculator engine 204. This may involve, for example, modifying the logic credit calculator engine 204 upon changes to the definition of various types of credits, adding new intervention technologies and descriptions thereof, modifying information about baseline technologies (e.g., based on fuel types in a given area, the diets of cows whose dung is being burned, types of wood, degrees of deforestation in different areas, etc.). Also, according to various embodiments, the credit calculator engine may be configured to retrieve this information automatically from an internal or externally available data source.

According to various embodiments, the analytics engine 213 may generate various statistical analyses of data available to the credit aggregator. For example, the analytics engine 213 may comprise functionality allowing an administrative user 222 to search and view entries in the installation database 232. The analytics engine 213 may also perform data-mining of the various databases 230, 232, 234. For example, the analytics engine 213 may evaluate and/or rank the MFI's 104 across a number of categories including, for example, additionality, permanence and leakage, financial strength, operability rates of equipment, etc.). Based on these evaluations, the analytics engine 213 may identify MFI's 104 that are candidates for certain remedial and/or exceptional products and services. For example, an MFI 104 with a small portfolio, but excellent quality may be a candidate to receive scale-up financing from the credit aggregator 102 and/or an associated financier. Generally strong MFI's 104 may be candidates for advance-purchase of credits (e.g., at the bid stage). Some MFI's 104 may be identified as candidates for consulting resources and/or leadership training (e.g., MFI's 104 with poor performers, MFI's 104 that appear on the cusp of a breakthrough, etc.).

In some embodiments, the credit tracker system 202 may also comprise a Customer Resource Management (CRM) engine 211. The CRM engine 211 may track and record each user and user interaction with the credit tracker system 202. Data regarding users from a particular MFI 104 or other entity may be stored at that's entities corresponding entry at the accounts database 234. For example, the accounts database 234 may store, for each MFI 104, Internet Protocol (IP) addresses and login times for each visit by a user from the MFI, indications of all key communications between credit aggregator 102 personnel and personnel of the MFI 104 (e.g., as entered by an administrative user 222), a copy of the executed contract between the MFI 104 and the credit aggregator 102, a status flag indicating whether the credit aggregator is currently accepting bids from the MFI 104, etc.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "computer device," "host," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

We claim:

1. A computer-implemented system for verifying the continuing validity of carbon reduction credits resulting from loans financing the purchase of energy technology, wherein the loans are originated by finance institutions, the system comprising:
   an electronic data storage comprising a database; and
   at least one computer device communicatively coupled to said database of said electronic data storage, the at least one computer device comprising:
      at least one processor;
      a memory circuit operatively associated with the at least one processor, wherein the memory comprises instructions that, when executed by the at least one processor, cause the at least one computer device to:
         provide an electronic user interface to a mobile device associated with a finance user, wherein the user interface comprises a first screen associated with a first finance institution loan financing the purchase of an intervention technology at a first location, wherein the user interface comprises a plurality of fields configured to receive:
            a name of a borrower of the loan;
            a physical address of the first location; and
            an indication of the operability of the intervention technology;
         receive from the finance institution user and via the user interface verification data, wherein the verification data comprises the name of the borrower of the loan, the physical address of the first location; the latitude and longitude of the first location; and the indication of the operability of the intervention technology;
         save the verification data to a database entry corresponding to the first finance institution loan; and
         conditioned upon the intervention technology being below a predetermined level of operability, to downgrade a carbon reduction credit associated with the first finance loan.

2. The system of claim 1, wherein the memory circuit further comprises instructions that, when executed by the at least one processor, cause the at least one computer device to, conditioned upon the carbon reduction credit associated with the first finance loan being downgraded, substitute the carbon reduction credit from a lot of carbon reduction credits.

3. The system of claim 1, wherein receiving from the finance institution the latitude and longitude of the first location comprises interrogating a Global Positioning System (GPS) functionally associated with the mobile device of the finance institution and present at the first location.

4. The system of claim 1, wherein the memory circuit further comprises instructions that, when executed by the at least one processor, cause the at least one computer device to conditioned upon the intervention technology being below a predetermined level of operability, downgrading a second credit associated with the first finance loan, wherein the second credit is selected from the group consisting of a Millennium Development Goal (MDG) credit, a biodiversity credit and a fair trade agricultural credit and a fair trade craft credit.

5. A computer-implemented method for verifying the continuing validity of carbon reduction credits resulting from loans financing the purchase of energy technology, wherein the loans are originated by finance institutions, the method comprising:

with at least one computer device, providing an electronic user interface to a mobile device associated with a finance user, wherein the user interface comprises a first screen associated with a first finance institution loan financing the purchase of an intervention technology at a first location, wherein the at least one computer device comprises at least one processor operatively associated with a memory, and wherein the user interface comprises a plurality of fields configured to receive:
a name of a borrower of the loan;
a physical address of the first location; and
an indication of the operability of the intervention technology;

with the at least one computer device, receiving from the finance institution user and via the user interface verification data, wherein the verification data comprises the name of the borrower of the loan, the physical address of the first location; the latitude and longitude of the first location; and the indication of the operability of the intervention technology;

with the at least one computer device, saving the verification data to a database entry corresponding to the first finance institution loan; and conditioned upon the intervention technology being below a predetermined level of operability, downgrading a carbon reduction credit associated with the first finance loan with the at least one computer device.

* * * * *